United States Patent Office 3,451,552
Patented June 24, 1969

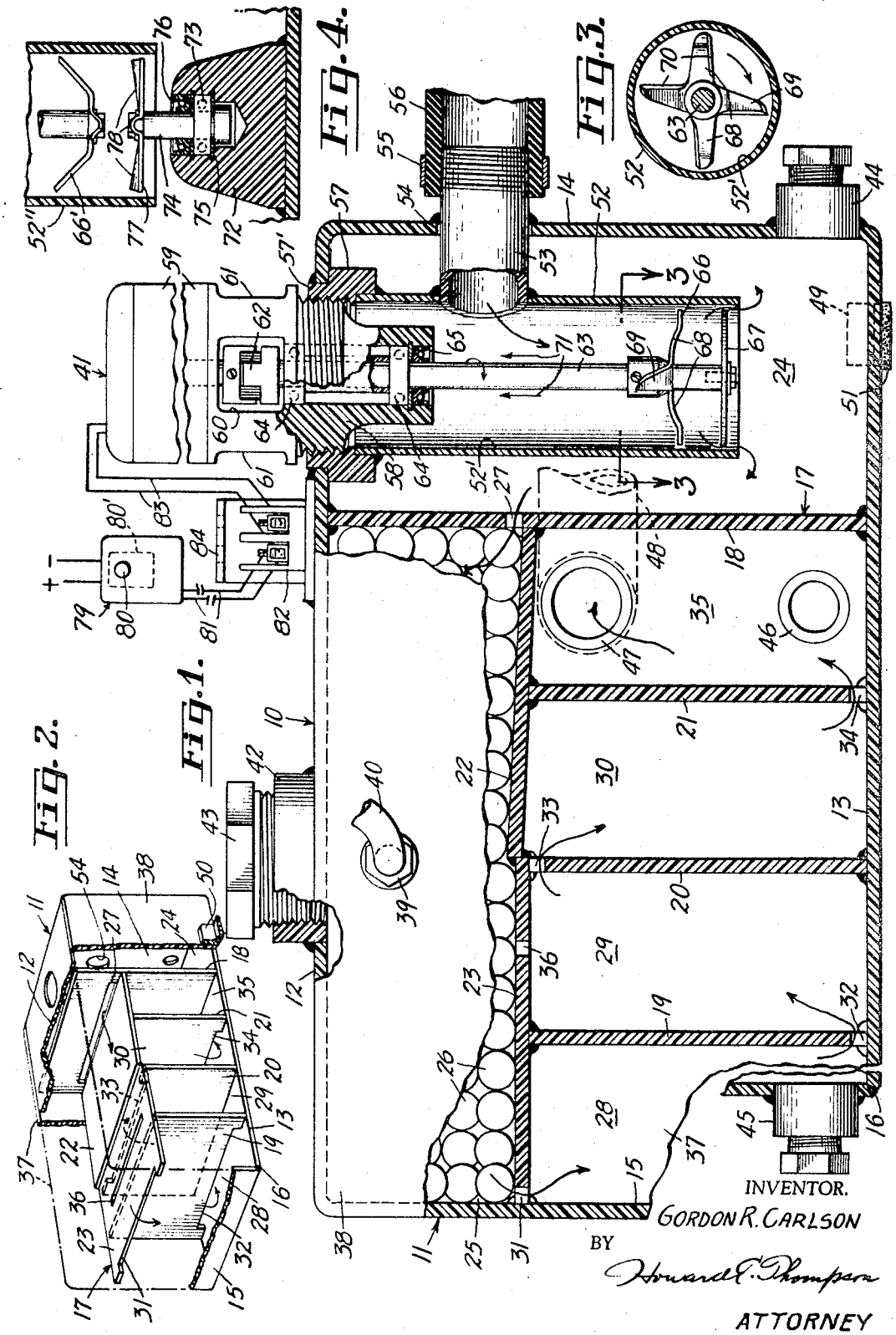

1

3,451,552
TREATMENT UNIT FOR CONTAMINATED EFFLUENT
Gordon R. Carlson, Metuchen, N.J. (P.O. Box 16, N. Dayton Station, Dayton, Ohio 45403)
Original application Nov. 10, 1966, Ser. No. 593,556. Divided and this application Aug. 9, 1967, Ser. No. 659,372
Int. Cl. B01d 35/02, 23/20, 33/18
U.S. Cl. 210—152                         10 Claims

ABSTRACT OF THE DISCLOSURE

A device for treating contaminated effluent, as from a toilet bowl, by passing it through a solid but soluble treating agent bed, which filters the effluent and treats it chemically to substantially minimize bacteria in the treated effluent. The device includes provisions by which the solid soluble treating agent normally is not in contact with much of the liquid effluent, to minimize the dissolution rate.

Cross-reference to related application

This application is a division of application Ser. No. 593,556, filed Nov. 10, 1966, and now abandoned, in the name of Gordon R. Carlson for Treatment Unit for Pollution Control Systems.

Background of the invention

This invention relates to a treatment unit for flushing toilets which are adapted to be used in locations where pollution control of the effluent from the toilet bowl is required. Typical of such units are those particularly adapted for use on boats, as well as other vehicles. Various forms of treatment devices have been proposed for boat toilets. Most of these embody some sort of macerating device which breaks down solids in the effluent, and some form of device for adding a liquid treating agent, generally liquid sodium hypochlorate to the effluent. Difficulties have been encountered with such units, particularly from the standpoint of proper metering of the liquid treating agent in order to achieve the most economical use thereof, while still obtaining the necessary bacteria kill, and also from the standpoint of handling of the liquid treating agent. This material is corrosive and will disfigure or destroy many parts with which it comes in contact, thus it should be handled carefully, and it is, thus, not the most desirable type of treating agent for use by the general public, as in the toilet systems of pleasure boats.

Summary of the invention

The present invention provides a novel treatment unit which is simple and economical in construction, highly efficient in operation, particularly by providing for use of solid materials (e.g. tablets), which are soluble in solution and provide adequate amounts of chlorine or equivalent for treatment of the effluent in a holding area of the unit, and further, provides a unit which includes means for complete drainage and cleanout. The treatment unit preferably includes an arrangement, whereby a bed of the solid soluble treating agent is supported as a form of filter bed through which the effluent flows, but in which, between operations, little or none of the liquid effluent is left to stand, thereby minimizing the dissolution of the solid treating agent during periods of nonuse.

The treatment unit preferably also includes a first holding area receiving the discharge from a macerator unit, and arranged with respect to the bed of solid treating agent such that some reverse flow of partially treated effluent occurs back into the first holding area at the end of an operation, thereby providing some quantity of partially treated liquid which can enter the first holding area and perform an initial partial treatment thereof. The treatment unit also includes a bottom wall portion in the treatment area, which is above the normal outlet drain of the unit, and so arranged that treated effluent will flow from the bed of treated material into a further holding area and, thence, to the drain, such that the effluent merely passes through the bed of solid soluble treating agent or tablets, but is not retained therein for any substantial length of time.

The provision of the foregoing arrangements, alone or in combination, constitute the principal objects of this invention.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side and sectional view of a unit with parts of the construction broken away, parts shown in elevation, and indicating by arrows the general flow of the system.

FIG. 2 is a diagrammatic perspective view of the casing assemblage, with wall portions broken away and indicated, in part, in dot-dash lines.

FIG. 3 is a section on the line 3—3 of FIG. 1, omitting background showing; and

FIG. 4 is a diagrammatic sectional view of part of the structure shown in FIG. 1 and illustrating a modification, with parts of the structure shown in elevation.

In illustrating one adaptation and use of the invention, FIG. 1 diagrammatically shows a treatment unit 10, constituting an assemblage of various components of the unit. At this time, it is pointed out that most of the parts of the unit, except for the motor and parts driven by the motor, are formed from suitable plastics and, in part, this is illustrated by the sectioning. By way of example, polyvinyl chloride can be employed.

Considering FIG. 1, 11 is the casing of the unit. In the present showing, the casing is formed from various sheets or strip parts, a long strip forming the top wall 12, bottom wall 13, and end walls 14 and 15, the ends 13 and 15 being welded, as seen at 16, by a plastic weld. This forms what can be termed an O-shaped casing. The wall structure of this casing, in another method of procedure, could be an extruded tube cut to the required casing width.

Arranged within the casing 11 is a preformed partition assemblage, generally identified by the reference 17. Considering FIG. 2, this assemblage could also be extruded and then cut to form the various openings, later described. However, as shown in FIG. 1, the assemblage 17 is formed from a series of preformed partition plates which are welded together, as diagrammatically shown.

The assemblage 17 comprises a tall partition 18, three short partitions 19, 20 and 21, and two partition plates 22–23, collectively forming a supplemental top wall extending between 15 and 18.

The assemblage 17, when mounted in the casing 11, forms a primary holding area 24, a secondary and treatment area 25 in which normally solid soluble calcium hypochlorate tablets 26 are arranged. The tablets may be said to comprise treatment agents or elements. At this time, it is pointed out that the arrangement of the tablets in the area 25 provides a filtration expediting the chlorination action, particularly if large particles in the effluent have passed from the area 24 into the tablet area 25. It will be apparent that the wall 22 is inclined downwardly in the direction of the area 24, which will cause some of the chlorine to drain into the area 24 through the passage 27 in the wall 18. This will provide partial treatment of the effluent in area 24 before passage into the area 25. Passage 27 is an elongated aperture, as will appear from the diagrammatic showing in FIG. 2.

The partitions 19, 20 and 21 form what might be termed baffled holding areas 28, 29 and 30. The plate 23 has a passage 31 placing area 25 in communication with area 28. Partition 19 has, at its lower end, a passage 32 placing area 28 in communication with area 29. Partition 20 has, at its upper end, a passage 33 placing area 29 in communication with area 30, and partition 21 has a passage 34 at its lower end placing the area 30 in communication with a discharge area 35. The contours of the passages 31, 32, 33 and 34 are clearly shown by the cutaway portions in the plates 23, 19, 20 and 21 in FIG. 2. Also in this figure is illustrated the elongated vent aperture 36 in plate 23.

The casing 11 also has side plates or walls 37 and 38. Mounted in the plate 38 is a hose coupling 39, with which a vent hose 40 is coupled to extend the vent to any practical position on the boat, in connection with which the unit 10 is mounted for ventilation of the unit. The side walls of the casing are suitably cemented to the side edges of 11, 18, 19, 20, 21, 22 and 23 in completing the wall structure of the unit 10.

In forming the casing 11, two apertures are formed in the top wall 12, one aperture for receiving a macerator assemblage 41, and the other aperture for receiving a threaded coupling sleeve 42, with which a closure plug 43 operates. This latter structure provides means for filling and refilling the tablets 26 in the area 25, as may be required. The walls 14, 15 and 37 are also apertured to receive sleeves 44, 45 and 46, respectively, these sleeves being similar to the sleeve 42, and receive drain plugs, generally similar to the plug 43. Two of these are shown on 44 and 45. The sleeve 46 opens into the discharge area 35. Another aperture is formed in the side wall 37 to receive another outlet sleeve 47. Coupled with the sleeve 47 is a discharge hose, indicated, in part, in dotted lines at 48 in FIG. 1.

Welded to the outer surface of each of the side plates 37–38 are L-shaped coupling brackets. One of the brackets of the plate 37 is indicated in dotted lines at 49 in FIG. 1, and at 50, FIG. 2, is shown one bracket on the plate 38. These brackets preferably have cushioned feet, one of which is shown at 51 on 49.

The assemblage 41 comprises a macerator tube 52, apertured at one side to receive a threaded intake pipe 53 welded to the tube 52 and also to the wall 14. This pipe passes through an aperture 54 in the wall 14, the aperture 54 being larger in diameter than the diameter of the pipe 53, for reasons later described. Fixed to the pipe 53 by a standard hose clamp 55 is a rubber tube 56, which extends to the toilet being serviced.

Mounted on and welded to the tube 52 is a pipe threaded coupling sleeve 57, having a reduced upper end 57'. This end is welded in the first named aperture of the top wall 12. At 58 is shown a motor mounting block, threaded to engage the pipe thread of 57 for detachable mounting of the macerator part of the assemblage 41.

The electric drive motor 59 of the assemblage 41 is suitably fixed to the upper portion of the block 58. This upper portion has side openings 60 and flat sides 61 for use of a wrench when necessary. At 62 is shown a motor shaft coupling, with which a drive shaft 63 of the macerator is coupled. In the lower portion of the block 58 are spaced ball bearings 64 for the shaft 63 and at 65 is shown a sealing ring engaging the shaft 63.

Fixed to the lower portion of the shaft 63 is a macerator blade 66 and fixed to the lower end of the shaft at the outlet end of the tube 52 is a discharge control and holding plate 67, the diameter of which is less than the diameter of the bore 52' of the tube 52 to control the maximum size of the particles discharged at the outlet end of the tube 52. The plate 66 has two opposed downwardly curved impellers 68 and two opposed upwardly flared impellers 69. All of the impellers have bevelled cutter edges 70. Note FIG. 3. In operation of the blade 66 at about 3000 r.p.m., the effluent delivered to the tube 52 is forced upwardly, as indicated by the arrows 71, FIG. 1, for an effective maceration of the effluent delivered to the tube 52, prior to discharge around the plate 67 into the area 24 and for later delivery into the area 25 for chlorination treatment.

With the structure shown in FIG. 1, the plate 67 rotating the blade 66 could, to a degree, retard the thorough maceration of the effluent beneath blade 66. This condition can be obviated by the modified showing in FIG. 4. Here, a bearing block 72 is welded to the bottom wall 13 of the casing 11. The block 72 supports a ball bearing 73, in which a stub shaft 74 freely rotates. The shaft 74 has an enlarged lower end engaged by a snap ring 75 to hold the shaft 74 in position. At 76 is shown a sealing ring engaging the shaft 74. The shaft 74 extends into the tube 52", which is similar in all respects to the tube 52. Fixed to the upper end of the shaft 74 is a disc 77, differing from the disc 67 in having four radially rounded and inwardly tapering upper ribs 78. These ribs act as blades engaged by the effluent below the blade 66' to break up and further act upon the effluent in producing a more perfect maceration action. It will be apparent that the disc 77 will rotate at a speed less than the speed of rotation of the blade 66', being driven only by movement of the effluent below the blade 66'.

Mounted at the toilet area is an electric control box, diagrammatically outlined at 79. Electric wires from a source enters this box, as shown. On the box is a pushbutton switch 80, controlling the circuit to the motor 59. The circuit wires 81 from the box 79 extend to a circuit coupler 82 mounted on the casing 11 adjacent the motor 59. Extending from coupler 82 are the circuit wires 83 leading to the motor 59. At 80' is indicated a timer in the box 79 for maintaining the circuit to the motor 59 closed for a predetermined period of time as, for example, sixty seconds, to care for the full discharge of the effluent from the toilet into the macerator tube 52. Arranged over the circuit coupler 82 is a plastic hood or guard 84.

In the use of the unit and when the motor 59 is not in operation, a fluid level would be established in the area 24, substantially in alinement with the discharge opening or passage 27. Further, keeping in mind that the discharge through the hose 48 is usually by gravity through the hull of the boat, the level of the treated or chlorinated liquid will be maintained in chambers 28, 29, 30 and 35 below the discharge at 47. However, when there is a discharge from a toilet through the hose 56 into the tube 52 and the motor 59 is in operation, there will be created a circulation of the effluent into the several areas, as diagrammatically illustrated by the arrows, shown in FIG. 1 of the drawing. This circulation takes place each and every time that the pushbutton 80 is actuated. As previously stated, in operation of the unit, part of the effluent introduced into the area 25 and treated by the tablets 26 can drain back into the chamber 24, which brings into this chamber part of the chlorine and which helps to treat the effluent initially delivered into the area 24, thus expediting the treatment cycle of operation of the unit.

To understand the general assemblage of the casing 11, it is pointed out that, after the welding operation at 16 in forming the O-shaped contour of the boundary walls of the casing, the first assemblage is the mounting of the tube 52 with the attached pipe 53 and the attached coupling sleeve 57 into the casing. Here, the enlarged diameter of the aperture 54 will assist in passing the pipe 53 through the aperture 54, while at the same time flexing the top wall 12 of the casing upwardly to a degree sufficient to pass the reduced upper end 57' of the sleeve 57 through the aperture in the top wall 12. The plastic material from which the casing is constructed has sufficient flexibility to accomplish this end result. When this assemblage has been made, the welding operations securing the sleeve 57 and the pipe 53 in position are performed with suitable jigs or the like for maintaining proper alinement of the tube 52 in the casing. On completing this operation, the assemblage of all the partition plates are mounted in the casing and secured in position by the welds, as diagrammatically illustrated. Here, it is to be kept in mind that the side walls of the casing have not been attached. At this time, it is also well to point out that the assemblage, as diagrammatically shown in FIG. 2, is, of course, not consistent with the procedure noted above but, to clarify and simplify the FIG. 2 showing, the tube 52 and its components, as well as the assemblage 41, have been omitted. The purpose of the showing in FIG. 2 is primarily to clearly illustrate the casing wall structures.

With regard to the macerator assemblage 41, this assemblage can be attached and detached, at will, for cleaning or other purposes. The attachment can be made by hand. However, at times, removal of the assemblage 41 may require the use of a wrench and, for this purpose, the flat sides 61 have been provided on the block 58.

In drainage treatment of the unit 10, wires 81 from the control box 79 are first detached from the circuit coupler 82. Then, both of the rubber hoses 48 and 56 are detached and 47 and 53 closed by closure plugs, in order to prevent spilling of the contents of the unit in transporting the same to a place where the unit is drained. In this drainage, the various sleeves 44, 45 and 46 are unplugged in the drainage of the area 24, as well as in draining the areas 28, 29, 30 and 35, it being understood that the area 25 will be drained into 24 and 28. In this drainage, the unit can be flushed with water or any other flushing liquid by introduction through 47 and 53 upon removing the plugs which had been attached.

For purposes of description, 24 can be regarded as the maceration delivery area or means, which area includes means for delivery of the effluent to a macerator tube, from which the macerated effluent is discharged into said area. The area 25 can be defined as a treatment area or means, the areas 28, 29 and 30 as the baffled areas or means and 35 as the discharge area or means. Further, in a simpler identification, 24 can be termed a first holding area, 25 the treatment and 28, 29 and 30 can collectively be regarded as a further holding area.

Having fully described my invention, what I claim as new and desire to secure by Letters Patent is:

1. A treatment unit for contaminated effluent, comprising a casing including partitions defining a first holding area, a treatment area and a further holding area, an inlet pipe adapted to receive the effluent for supply to said first holding area, said treatment area connected to said first holding area adapted to receive an overflow of effluent from the upper part of said first holding area, said further holding area having a discharge tube therefrom and positioned entirely below and connected in communication with said treatment area, whereby effluent overflowing into said treatment area passes therethrough and into said further holding area substantially without collecting in said treatment area, means in said further holding area for retarding the treated effluent prior to its flowing to said discharge tube, and a quantity of normal solid soluble treatment agents forming a bed in said treatment area, through which the effluent must flow in passing through said treatment area.

2. A treatment unit as defined in claim 1, which includes a macerator unit connected to receive the effluent from said inlet pipe and operative to discharge into said first holding area effluent containing particles of no greater than a predetermined maximum size, and control means connected to said macerator unit for selective operation thereof.

3. A treatment unit as defined in claim 1, wherein a portion of said treatment area is inclined to cause a reverse flow of some treated effluent back into said first holding area.

4. A treatment unit as defined in claim 1, wherein said bed is formed by a quantity of chlorine containing tablets capable of slowly dissolving in the effluent to release chlorine as the effective treating substance.

5. A treatment unit as defined in claim 2, wherein said macerator unit includes a generally vertical tube having discharge into the bottom of said first holding area, below the normal liquid level therein.

6. A treatment unit as defined in claim 5, wherein said treatment area includes a bottom wall portion sloping downwardly toward said first treatment area for causing some treated effluent to pass back into the first treatment area to partially treat effluent initially delivered to the first holding area.

7. In a treatment unit of the character defined employing means forming a first holding area and further holding areas, means forming a treatment area interposed between the first holding and further holding areas and entirely above said further holding areas, a macerator unit connected to receive effluent from an intake pipe, said treatment area supporting a plurality of treatment elements forming filter means, through which the effluent passes prior to discharge into the further holding areas, means for discharging macerated effluent from said macerator unit into the first holding area, and means for discharging the treated effluent from one of said further holding area.

8. A treatment unit as defined in claim 7, wherein means is provided for returning part of the treated effluent from the treatment area back into said first holding area.

9. A treatment unit as defined in claim 7, wherein the treatment elements of said treatment area comprise a quantity of chlorine containing tablets capable of slowly dissolving in the effluent to release chlorine as an effective treating substance in said treatment area.

10. A treatment unit as defined in claim 7, wherein the means discharging the effluent into the first holding area includes means for minimizing size of particles discharged into said first holding area.

References Cited

UNITED STATES PATENTS

| 360,455 | 4/1887 | McConnell | 210—206 |
|---|---|---|---|
| 691,365 | 1/1902 | Dittler | 210—202 X |
| 753,880 | 3/1904 | Greth | 210—207 |
| 890,301 | 6/1908 | Reisert | 210—202 |
| 2,486,691 | 11/1949 | Travers | 210—201 X |
| 2,676,666 | 4/1954 | Howe | 210—173 X |
| 2,798,228 | 7/1957 | Boester. | |
| 2,820,701 | 1/1958 | Leslie | 210—206 X |
| 3,123,555 | 3/1964 | Moore | 210—261 X |

REUBEN FRIEDMAN, *Primary Examiner.*

JOHN ADEE, *Assistant Examiner.*

U.S. Cl. X.R.

210—196, 202, 206, 265; 241—46.17, 79.1, 101